United States Patent [19]
Thompson et al.

[11] 3,736,387
[45] May 29, 1973

[54] METHOD AND ACCESSORY FOR TESTING THE SERVICEABILITY OF TELEPHONE CONDUCTORS

[76] Inventors: John T. Thompson, 244 Loring St., Los Angeles, Calif. 90024; George W. Gillemot, 2331 20th St., Santa Monica, Calif. 90405

[22] Filed: Dec. 14, 1970

[21] Appl. No.: 97,531

[52] U.S. Cl. ................179/175, 339/49 R, 179/1 PC
[51] Int. Cl. ................H04m 3/22
[58] Field of Search ............179/175, 1 PC, 175.1 R, 179/62, 99; 339/150 A, 49 R; 292/56, 115

[56] References Cited

UNITED STATES PATENTS

| | | | |
|---|---|---|---|
| 2,158,630 | 5/1939 | Lloyd | 179/175 |
| 966,728 | 8/1910 | Adams | 179/175 |
| 3,467,942 | 9/1969 | Dell et al. | 339/49 R |
| 2,134,314 | 10/1938 | O'Donnell | 292/115 |
| 1,026,051 | 5/1912 | Rodatt | 292/115 |

OTHER PUBLICATIONS

"Fundamentals of XY Dial Systems" by Stromberg-Carlson, p. 49, 1956.

*Primary Examiner*—Kathleen H. Claffy
*Assistant Examiner*—Douglas W. Olms
*Attorney*—Sellers and Brace

[57] ABSTRACT

An improved accessory, technique and method for testing telephone conductors at a central station main frame equipped with terminal boards having a separate contactor for each conductor. The testing equipment is connectable to the conductors terminating at any terminal board through a flexible patching cable provided at one end with a separate contact pin for each terminal board contactor and with manually operable clamping jaws for holding these pins assembled to the contactors. In larger installations the patching cable is made in separable sections, a plurality of one of these sections being permanently installed and selectively connectable to the test equipment using a mobile patching section to connect a terminal board to the adjacent end of the nearest end of the permanently installed sections.

6 Claims, 6 Drawing Figures

JOHN T. THOMPSON
GEORGE W. GILLEMOT
INVENTORS.

BY [signature]
ATTORNEYS

METHOD AND ACCESSORY FOR TESTING THE SERVICEABILITY OF TELEPHONE CONDUCTORS

This invention relates to testing procedures for installed telephone cables, and more particularly, to an improved method and accessory for connecting testing equipment to a selected group of telephone conductors at the central station end thereof.

The large number of telephone cables serving a metropolitan area terminate at a multiplicity of terminal boards supported vertically along one face of a main frame of a central station. The terminal boards include protective devices for each conductor and means for connecting each to the central station switch gear. From time to time it is necessary to check individual cable conductors for serviceability. Various proposals have been made heretofore for performing these test operations including both portable test instrumentation movable directly to the terminal board to be tested and various other expedients for performing the test operations from central test equipment connected through cabling to test probes laboriously manipulated by hand into contact with exposed portions of the conductors at the terminal boards. A major problem not satisfactorily overcome heretofore involves providing a reliable, positive connection between the test probes and the terminal end of each conductor to be tested.

Recently an improved terminal board has been developed and placed in service incorporating at either end rows of contactors permanently connected to individual ones of the cable conductors. These contactors are arranged in five rows of 20 contactors each extending transversely of either end of the board and representing 50 pairs of telephone conductors. By connecting these contactors to the test equipment through manually manipulated probes the tester could test each individual conductor or pair of conductors at will. This is a very tedious and time-consuming operation requiring one operator to hold the test probe and a second to manipulate the test equipment and entails the strong likelihood of error and the omission of conductors from the test program. Additionally substantial areas of the front face of the main frame are obstructed by the presence of the test equipment and crew.

By the present invention these and other serious objections are avoided and the efficiency and effectiveness of the testing operation is vastly improved.

To this end, the invention provides a patch cord accessory of simple, easily manipulated construction readily connectable to either end of a selected terminal board thereby temporarily connecting a multiplicity of pairs of terminal board conductors to the test equipment at a central test station manned by a single test operator. The operator proceeds at his leisure and convenience to test the individual conductors and pairs by stepping selector switches from one conductor to another in succession and noting the instrument reading for each and recording the results if desired in a test log with complete assurance at the end of the test that all conductors have been tested. The patching accessory may extend directly from the selected terminal board to the test instrument usually located along the corridor serving the main frame or, in a preferred arrangement, the patching accessory is made in two sections, one of which is permanently installed beneath the corridor and the other of which is mobile and readily patched between a terminal board and the nearest end of a permanently installed section. Various ones of the permanently installed cable sections have their outlet ends distributed along the front of the main frame. The mobile section is provided with connectors readily attachable to the just referred to outlets of the permanent cable sections. The two-section patching accessory therefor makes possible the connection of any selected terminal board to the test instrument without need for blocking the corridor or risk of injury to the patching cable by personnel and equipment using the corridor during the test operation.

Accordingly, it is a primary object of the invention to provide an improved testing accessory and a unique method of testing the central station end of telephone conductors.

Another object of the invention is the provision of a simple, rugged, lightweight accessory for connecting a multiplicity of installed telephone conductors to testing equipment without interrupting phone service and using a minimum of personnel and test equipment.

Another object of the invention is the provision of a testing accessory comprising a flexible, patching cable equipped, at one end, with a gang connector assembly quickly and reliably anchorable to a multiplicity of terminal board contactors permanently connected to individual cable conductors and equipped, at its other end with separable couplings connectable to testing equipment.

Another object of the invention is the provision of a patching cable accessory utilizing any one of a plurality of permanently installed sections having one end connectable to central station test equipment and the other end distributed along a telephone main frame and mateable with a mobile flexible extension connectable to a selected terminal board.

Another object of the invention is the provision of a patching cable testing accessory equipped at one end with a gang connector having a multiplicity of pins each anchorable temporarily to a different terminal strip contactor.

These and other more specific objects will appear upon reading the following specification and claims and upon considering in connection therewith the attached drawing to which they relate.

Referring now to the drawing in which a preferred embodiment of the invention is illustrated:

Figure 1:
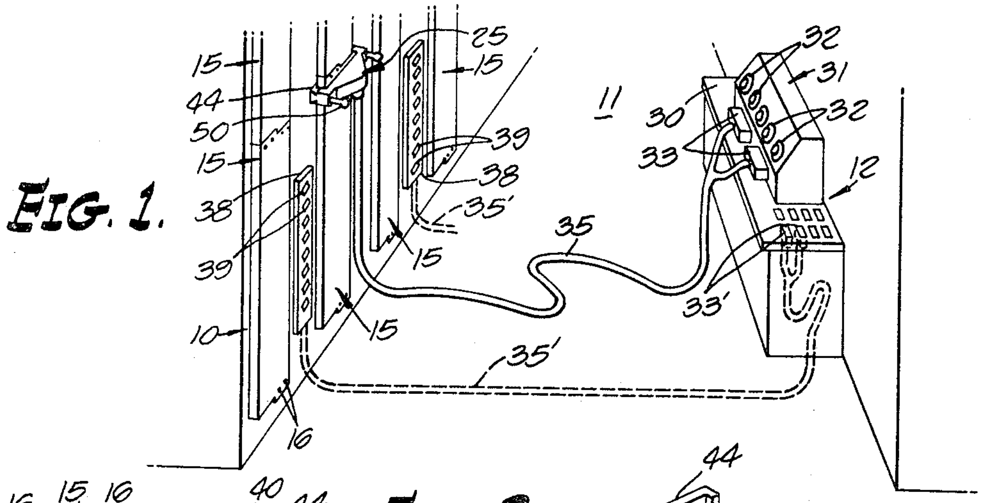
FIG. 1 is a generally schematic view showing a portion of a central station main frame with one of its terminal boards connected by the invention patching cable to instrumentation at a test station.

Referring initially more particularly to FIG. 1, there is shown a portion of a telephone central station having a main frame 10 extending along one side of an access corridor 11 provided along one side with a conductor test station 12. As is well known, main frame 10 is equipped along the side facing the corridor with closely spaced vertical rows of terminal boards 15,15 rigidly anchored thereto by assembly bolts 16. Cables of conductors have one end terminating at the central station main frame 10 and their other ends connected to individual subscribers in the area served by that station. Each conductor terminates in one of each pair of female sockets 17 distributed along the face of terminal board 15. Alternate ones of sockets 17 are connected by separate conductors to the central station switch gear. A connection between each main cable conductor and a switch gear conductor is completed when the contactor pins of a line protector device 18 are inserted into sockets 17. Protectors 18 are arranged in vertical and horizontal rows along the face of the terminal board and each includes a finger grip 19 at its outer end which can be used to withdraw and reinsert an individual protector in a set of sockets 17.

Figures 2, 4, 6:
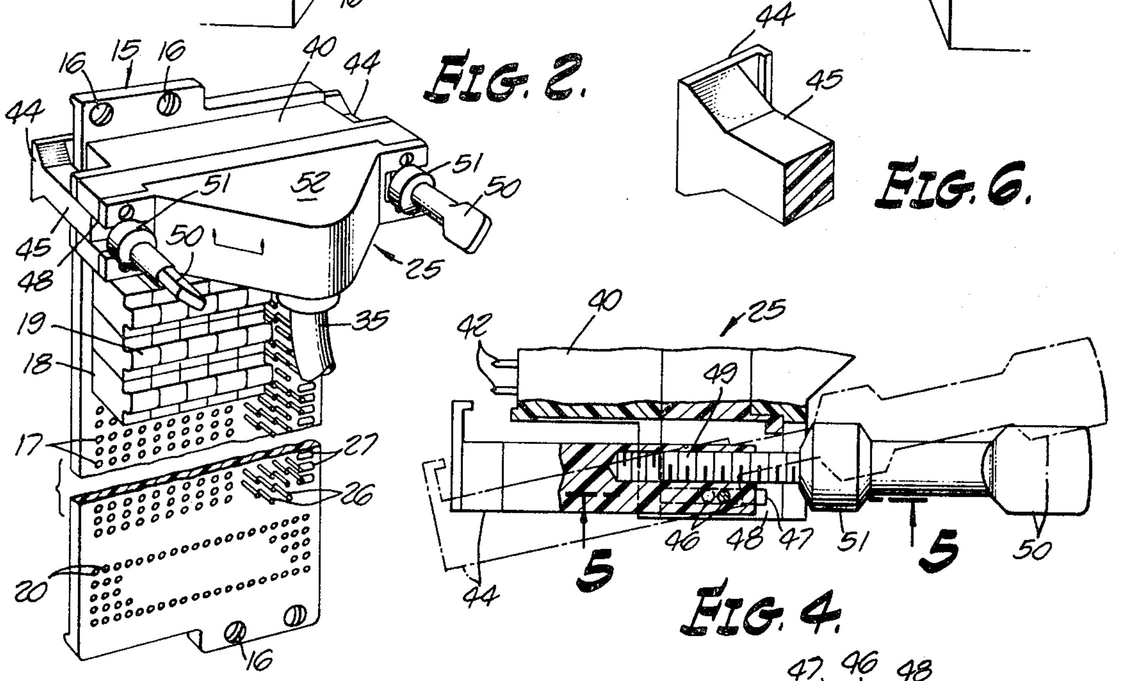
FIG. 2 is a perspective view on an enlarged scale of a typical terminal board having the invention patching cable accessory anchored to its upper end.
FIG. 4 is a fragmentary cross-sectional view on an enlarged scale through the clamping jaw at one end of the gang connector.
FIG. 6 is a fragmentary perspective view of a portion of one clamping jaw.

Each terminal board 15 also includes a separate metallic contactor 20 having an exposed end on the front face of the terminal board. A typical terminal board has provision for 100 pairs of telephone conductors in which case there is a separate contactor 20 for each side of the 100 lines and each of which has permanent connection embedded in the terminal board and interconnecting a line conductor with an individual one of contactors 20. As shown in FIG. 2 the contactors for 50 pairs of the line are arranged in parallel rows extending transversely of both the upper and the lower ends of the terminal board. The 100 contactors at the upper end of the board 15 are not visible in FIG. 2 since they are concealed by the assembly thereover of the invention gang connector 25 of the test accessory.

Terminal board 15 is also equipped with a multiplicity of terminal lugs 26 along its right hand edge each of which is connected to a socket 17 paired with a particular incoming cable line. The central station switch gear is connected to a selected one of lugs 26 by conductors entering through passages 27 along the right hand lateral edge of the terminal board and individually soldered to a selected one of pins 26.

Test station 12 is provided with a counter 30 supporting a suitable testing instrument 31 equipped with various instruments and indicators, not illustrated, and a plurality of conductor selector switches 32. The face of the instrument also has a pair of multiple contact sockets for seating the contactor pins of cable connectors 33 provided at the instrument end of patching cable 35. This cable includes a separate conductor connectable to a contactor 20 at one end of the terminal board. Half of these conductors terminate in a respective one of connectors 33.

It will be understood that the patching cable accessory 25,33,35 may be formed in a single unit as shown in full lines in FIG. 1 or, alternatively, it may include a permanently installed section 35' having one end terminating in a pair of connectors 33' normally stored in suitable receptacles at one end of counter 30, the opposite end terminating in a permanently installed connector fixture 38 mounted on the main frame between adjacent rows of terminal boards 15. Fixtures 38 are equipped with pairs of connector receptacles 39,39 each equipped with sockets for seating the pins of connectors 33 of the mobile section of the patching cable 35. Thus it will be understood that the mobile section of the patching cable 35 need not extend across corridor 11 but instead is restricted to the main frame side of the corridor where its connectors 33 can be inserted into receptacles 39 on the particular one of fixtures 38 most conveniently located to the terminal board under test. When used in this manner, the mobile section of the patching cable is confined to the main frame side of corridor 11 and its permanently installed section 35' is utilized for completing the connection to testing instrument 31. It will be observed that fixtures 38 are provided with multiple pairs of receptacles 39 and these are useful for purposes not germane to the present invention.

Figure 5:
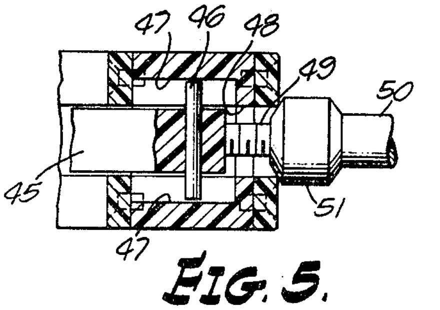
FIG. 5 is a fragmentary view on an enlarged scale taken along line 5—5 on FIG. 4.

Gang connector 25 has a main body 40 having a width only slightly greater than the width of the five rows of contactors 20 and is fitted with a separate spring biased contactor pin 42 positioned to register with and seat against a corresponding one of the contactors when clamped in position thereover. For the latter purpose the connector is provided with a pair of J-shaped clamping jaws 44 the shank end 45 of which carries a trunion pin 46 (FIG. 5) having limited freedom of movement in a pair of grooves 47 formed in the opposite side walls of the bifurcated portions 48 of main body 40. Opening through the outer ends of the clamping jaws shanks 45 are threaded wells seating the threaded stems 49 of thumb nuts 50. These thumb nuts are formed with a collar 51 which engages the edges of the notched ends of the connector end cap 52.

Figure 3:
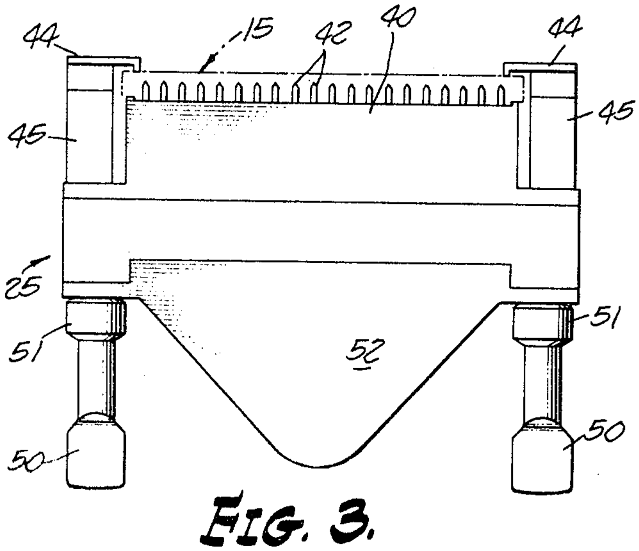
FIG. 3 is a top plan view of the tap shoe per se.

It will be readily apparent from the foregoing that when thumb nuts 50 are rotated to tighten them into the threaded wells of jaws 44, the jaws are pulled against the rear surface of terminal board 15 in the manner best illustrated in FIG. 3. It will be understood that pins 42 are connected to individual ones of the conductors in the patching cable 35 and that these are reciprocal axially of the pins for a considerable distance. Accordingly, as the gang connector is clamped against the face of the terminal board the pointed ends of pins 42 are forced into resilient positive contacting engagement with the surfaces of a related contactor 20. When the thumb nut 50 is loosened the jaw is free to shift lengthwise of grooves 47 as well as to pivot about the axis of trunion pin 46 in the manner indicated in FIG. 4. Relatively small pivotal movement suffices to maneuver the clamping jaws into and out of clamping position about the opposite edges of terminal board 15.

The operation and mode of use of the invention will be apparent from the foregoing description of its components. It will be understood that the user has his option of connecting the couplings 33 directly to the input sockets of test equipment 31 or, to an appropriate pair of connector sockets 39 of the nearest test cable fixture 38 on the main frame. Each one of these connectors 33 has provision for 25 pairs of conductors. Accordingly, a pair of the couplings has accommodations for 50 pairs of conductors. If tap shoe 25 is connected to the upper end of a terminal board 15 then the two couplings 33 test the 50 pairs of conductors associated with the upper end half of the terminal board, whereas if the connector is connected to the lower set of contactors on the terminal board, then one of the couplings 33 handles pairs 51–75 and the other handles pairs of conductors 76–100.

Usually the operator prefers to use patching cord 35 in combination with a permanently installed section 35' thereby leaving corridor 11 unobstructed and free for use by both foot traffic and wheeled equipment. Fixtures 38 usually have facilities for handling more than one mobile patching cable section and for this reason the test station 12 is provided with multiple sets of long flexible cable branches each provided with a pair of connectors 33'. The flexible sections of cables not in use drop into the interior of the test counter where they are readily available for withdrawal and connection to the test equipment when and as needed.

It will be readily appreciated that gang connector 25 is quickly assembled and disassembled relative to either set of contactors on a selected terminal board 15 after which the operator moves to the test bench and quickly proceeds to check the individual conductors by moving the various contact selector switches 32, observing the results on the test instrument and entering these results on a log sheet as he proceeds from wire to wire in sequence until all have been checked.

While the particular method and accessory for testing the serviceability of telephone conductors herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. That improvement in a testing accessory for testing telephone lines from the ends thereof terminating on a central station terminal board of the type having closely spaced rows of contactors crosswise of the ends thereof each permanently connected to a separate telephone conductor terminal lug, said improvement comprising a gang connector assembly for a flexible cable connectable to test equipment remote from the terminal board, said gang connector having a relatively narrow rigid hollow main body of a length corresponding generally to the width of the front face of a terminal board, said connector assembly having a foremost face forward of all other portions of said main body, a separate spring biased pin for each of 50 pairs of contactor pins protruding from the foremost face of said main body and which contactor pins are positioned to contact a respective one of said contactors when pressed theretoward, an elongated clamping jaw extending closely beside each end of said main body spaced apart a distance corresponding generally to the width of a terminal board and journalled thereto on an axis extending crosswise of said ends, said clamping jaws having hook-shaped ends extending toward one another and adapted for insertion between the lateral edges of closely spaced rows of terminal boards into embracing engagement behind the lateral edges at one end of a selected terminal board, and said clamping jaws having separate manually operable adjustable means accessible from the rearmost face of said main body for tightening said clamping jaws to clamp said gang connector assembly rigid crosswise of one end of a terminal board with said spring biased contactor pins pressed in firm contact with respective contactors of all telephone lines connected crosswise of one end of the terminal board.

2. That improvement defined in claim 1 characterized in that said clamping jaws are generally J-shaped with the shank end thereof pivotally supported in slot means extending lengthwise of either end of said main body, and adjustable means connected to the outer shank end of said jaws operable to force said pins forcibly against a respective one of said contactors as an incident to tightening said jaws against the rear lateral edges of said terminal board.

3. That improvement defined in claim 2 characterized in that the opposite ends of said main body are bifurcated, the sidewalls of said bifurcations having said slot means therein in the form of grooves facing toward one another from the inner sidewalls of said bifurcations on trunnion means having their ends extending into said grooves.

4. That improvement defined in claim 3 characterized in the provision of thumb nut means seated in threaded bores opening axially of the shank portions of said clamping jaws and having a flange engageable with the main body of said gang connector as the thumb nut is tightened.

5. That improvement defined in claim 4 characterized in that said clamping jaws are pivotable away from one another and from the adjacent lateral edge of the terminal board when said thumb nuts are loosened, thereby permitting said jaws to be assembled to and disassembled from a terminal board.

6. That improvement in a gang connector for coupling 50 pairs of telephone lines each connected to individual contactors arranged in rows crosswise of one end of a central station terminal board, said gang connector comprising a relatively long narrow hollow housing having a length corresponding generally to the width of a central station terminal board and a width somewhat greater than the width of the area occupied by said rows of 100 contactors, 50 pairs of spring biased pins projecting from the foremost face of said housing and adapted to engage a respective one of 50 pairs of contactors at one end of a terminal board, flexible cable means extending from a sidewall of said housing and including a separate conductor connected to a separate one of said pins, J-shaped clamping jaw means having the stem portion of each pivotally coupled closely beside a respective end of said housing and including adjustable means therefor manipulatable from the rearmost face of said housing, the forward hooked ends of said jaws facing toward one another and being engageable behind the rear corners of the lateral edges of a terminal board and operable when said clamps are tightened to press said 50 pairs of pins into pressure contact with a respective one of said 50 pairs of contactors at one end of a terminal board.

* * * * *